US012199939B2

(12) United States Patent
Wright (10) Patent No.: US 12,199,939 B2
(45) Date of Patent: Jan. 14, 2025

(54) COMMUNICATION NETWORKING SYSTEM (71) Applicant: GREEN LINE BUSINESS GROUP, LLC, Newark, DE (US)

(72) Inventor: Anthony D. Wright, Wilmington, DE (US)

(73) Assignee: Green Line Business Group, LLC, Newark, DE (US)

( * ) Notice: Subject to any disclaimer, the term of this patent is extended or adjusted under 35 U.S.C. 154(b) by 0 days.

(21) Appl. No.: 17/793,556

(22) PCT Filed: Jan. 19, 2021

(86) PCT No.: PCT/US2021/013951
§ 371 (c)(1),
(2) Date: Jul. 18, 2022

(87) PCT Pub. No.: WO2021/146707
PCT Pub. Date: Jul. 22, 2021

(65) Prior Publication Data
US 2023/0051297 A1    Feb. 16, 2023

Related U.S. Application Data

(60) Provisional application No. 62/978,981, filed on Feb. 20, 2020, provisional application No. 62/962,142, filed on Jan. 16, 2020.

(51) Int. Cl.
*H04L 51/48* (2022.01)
*G06Q 30/0207* (2023.01)
*H04L 51/42* (2022.01)

(52) U.S. Cl.
CPC ......... *H04L 51/48* (2022.05); *G06Q 30/0236* (2013.01); *H04L 51/42* (2022.05)

(58) Field of Classification Search
CPC ...... H04L 51/42; H04L 51/48; G06Q 30/0236
(Continued)

(56) References Cited

U.S. PATENT DOCUMENTS 7,184,970 B1 * 2/2007 Squillante .............. G06Q 30/02
705/14.27
7,305,364 B2 * 12/2007 Nabe ...................... G06Q 40/03
705/37

(Continued)

FOREIGN PATENT DOCUMENTS

EP    1 223 527 A2    7/2002
WO    WO-0120520 A2 *  3/2001 ............. G06Q 30/02
(Continued)

OTHER PUBLICATIONS

International Search Report for PCT/US2021/013951.
Written Opinion for PCT/US2021/013951.

*Primary Examiner* — James E Springer
(74) *Attorney, Agent, or Firm* — Devlin Law Firm LLC (57) ABSTRACT

A communication networking system and a method of email communication is described, wherein a solicitor sends a solicitor communication to an email list a selected contact organization from a plurality of contact organizations listed on the website of the communication networking system for a fee; wherein the plurality of email list recipients of the contact organization's email list is not divulged to the solicitor. This communication networking system enables solicitor organizations and individuals to have access to the email recipients of contact organization's email list for soliciting support, information, business promotions, educational information, announcement and the like. Each contact organization may have associated geographical information, medical condition information and the like stored on the communication networking system database. A contact organization may be charitable or non-profit organization (Continued)

and the communication networking system may be configured to help individuals and organizations that support those with ailments or medical conditions.

16 Claims, 6 Drawing Sheets

(58) Field of Classification Search
USPC .......................................................... 709/206
See application file for complete search history.

(56) References Cited

U.S. PATENT DOCUMENTS

| | | | |
|---|---|---|---|
| 2006/0271436 A1* | 11/2006 | Aubertin | G06Q 30/0235 |
| | | | 705/14.3 |
| 2008/0027960 A1* | 1/2008 | Fulgham | G06Q 10/107 |
| 2008/0250453 A1* | 10/2008 | Smith | H04N 21/812 |
| | | | 725/39 |
| 2010/0153285 A1 | 6/2010 | Anderson et al. | |
| 2010/0235295 A1* | 9/2010 | Zides | G06Q 30/0282 |
| | | | 705/347 |
| 2014/0304157 A1 | 10/2014 | Bachenheimer et al. | |
| 2018/0004904 A1* | 1/2018 | Phillips | G16H 50/30 |
| 2021/0374802 A1* | 12/2021 | Longo | G06Q 30/0255 |

FOREIGN PATENT DOCUMENTS

| | | | | |
|---|---|---|---|---|
| WO | WO-0165442 A1 * | 9/2001 | | G06Q 30/02 |
| WO | WO-2007131172 A2 * | 11/2007 | | G06Q 30/0212 |

\* cited by examiner

COMMUNICATION NETWORKING SYSTEM

CROSS REFERENCE TO RELATED APPLICATIONS

This application claims the benefit of priority to U.S. Provisional Application No. 62/962,142, filed on Jan. 16, 2020 and U.S. Provisional Application No. 62/978,981, filed Feb. 20, 2020; the entirety of which are hereby incorporated by reference herein.

BACKGROUND OF THE INVENTION

Field of the Invention

The invention relates a communication networking system and a method of email communication wherein a solicitor sends a solicitor communication to an email list a selected contact organization from a plurality of contact organizations listed on the website of the communication networking system for a fee; wherein the plurality of email list recipients of the contact organization's email list is not divulged to the solicitor.

Background

It is difficult for people with challenges including economic challenges, disabilities, illnesses, medical conditions and special needs to understand what resources are available to them. There are a wide number of government, private, and community organizations including non-profit organizations and charitable organizations that offer aid and assistance for those with life challenges. Internet searching may help them find some of the organizations and resources, but this is time consuming and may not result in identifying a specific organization that is well suited for the challenges faced.

Individuals, organizations including businesses, government agencies, community organizations, non-profit and for-profit organizations often want to reach out to specific subsets of the public or to another organization for making announcements, advertising or making a special offer. As there is seldom a way to target these subsets of people, organizations and individuals are often left with posting public communications that are less effective.

SUMMARY OF THE INVENTION

The invention is directed to a communication networking system and a method of email communication wherein a solicitor sends a solicitor communication to an email list a selected contact organization from a plurality of contact organizations listed on the website of the communication networking system for a fee; wherein the plurality of email list recipients of the contact organization's email list is not divulged to the solicitor. This communication networking system enables solicitor organizations and individuals to have access to the email recipients of contact organization's email list for soliciting support, information, business promotions, educational information, announcement and the like. The website may provide a search feature for the solicitor to search for contact organizations that meet their search criteria. Each contact organization may have associated geographical information, medical condition information and the like stored on the communication networking system database. In an exemplary embodiment, the contact organization may be charitable or non-profit organization and the communication networking system is configured to help individuals and organizations that support those with challenges including economic challenges, disabilities, illnesses and special needs, ailments or medical conditions.

An exemplary contact organization may be a business organization that provides goods or services, including hotels, hospitals, medical companies, and may include non-profit or charitable organizations that provide resources, including money, and services to those with challenges.

A contact organization may be a "share-my-email" organization, a grouping of individuals that have provided their email addresses to the communication networking system. A share-my-email organization may be made up of community members or individuals that have provided their email to the communication networking system and wherein these individuals may also provide addition geographical, demographic or medical condition information about themselves that can be searched through a search feature to produce a searched share-my-email organization list of email address. For example, a person wanting to join the "share-my-email" contact organization may use the contact organization website interface and input gender male, age 62, residence Newark DE, and medical skin cancer. They may also input their email address and may select how many emails they are willing to receive within a certain period of time, or buffer time. Some individuals may select ten communications per day, while others may select only two per day. These individuals of the "share-my-email" contact organization may receive payment for each email that they receive. Alternatively, each individual of the "share-my-email" organization may select a charitable organization to receive all or a portion of their payment.

A solicitor may be an individual such as a community member of the communication networking system, a contact organization, sole proprietor organization, a non-profit or for-profit organization, a government or community group or agency and the like. The solicitor organization may desire to send an email communication to one or more of the contact organizations of the communication networking system. A contact organization of the communication networking system may be a solicitor organization to send an email to another contact organization of the communication networking system. A solicitor may view a list of contact organizations or do a search of the "share-my-email" organizations to create a searched "share-my-email" organization on the solicitor website interface of the website. The display of the list of contact organizations may include the fee required for sending a communication to the contact organization's email list of organization recipient email addresses. The website may display the number of email addresses associated with each of the contact organizations and the fee for sending a communication, wherein the larger the number of email addresses, the larger the fee may be. The solicitor may then select a contact organization and send a solicitor email communication which may require approval by the contact organization before the solicitor email communication is sent out. If the contact organization approves the solicitor email communication, payment may be collected from the solicitor by the communication networking system and the solicitor email communication is sent to the organization recipient email addresses of the contact organization's email list.

In an exemplary embodiment, a contact organization will only allow a certain number of solicitor emails to be sent to recipients on their contact organization's email list within a certain period of time. For example, a hospital may allow one solicitor email communication per day and require a set fee for this service. This limit on the number of emails allowed may prevent the recipients on the contact organization's email list from getting too many emails. This buffer time for allowing solicitor email communications may be changed by the contact organization through a contact organization website interface on the website. The contact organization may also change the fee or the portion of payment they want to receive from a solicitor email communication being sent to their contact organization's email list. The payment required by the solicitor may be some larger amount than that received by the contact organization. The communication networking system may handle collecting and receiving payment from the solicitor and may retain a portion of the solicitor payment and provide a portion to the contact organization. Some portion of the payment may also be applied to a charitable organization of the solicitor and/or the contact organization's selection, again, which may be selected through an interface on the website.

In an exemplary embodiment, an online auction is provided on the communication networking system website for solicitors to bid on sending their own solicitor email communication to the contact organization's email list. The highest bidding solicitor before a termination time for the auction may then send their solicitor email communication to the contact organization's email list, provided it is approved.

A solicitor email communication may first have to be approved by the contact organization before it is sent out to their contact organization's email list. This approval process is required to ensure that solicitor email communications are appropriate and not offensive.

A solicitor display screen of the website may show a list of contact organizations, the number of recipient emails per each of the contact organizations displayed, a fee for sending a solicitor email communication and a buffer time. A solicitor may use a contact organization search feature to search for contact organizations base on geographical area, and/or type of goods or services they provide or by medical condition with which they may be associated. For example, a solicitor may be a charitable organization that is wanting to get the word out about a 5K event in Philadelphia to benefit lung cancer research, and the solicitor may input into a search input of a contact organization search feature, "lung cancer" and "Pennsylvania" to see a list of contact organizations in Pennsylvania that are associated with cancer or lung cancer. The solicitor may view the fees and number of recipients on each of the contact organizations shown and select those to whom they want to send their solicitor email communication. After approval of the solicitor's email regarding the announcement of the 5K event by the contact organization or organizations, the solicitor email communication is sent and a portion of the payment from the solicitor is provided to the contact organization(s).

In an exemplary embodiment, a solicitor may select two contact organizations through the solicitor website interface and then also select a "both" option, which means their solicitor email communication will only be sent to email recipients that are on both of the selected contact organization's email lists. This is a way to better target a particular subset of two or more contact organizations email recipients. There may be an additional fee for this type of more targeted communication.

In addition, a solicitor, which may be an organization, may search the "share-my-email" organization for individuals that meet a geographical, demographic and/or medical condition search set. A medical company doing research on skin cancer may be looking for volunteers of a particular age to conduct some clinical trials and may include geographical region, age, and skin cancer as search criteria of the "share-my-email" search feature. The organization user interface may display the number of recipients that meet the search criteria and a fee for sending a solicitor email to these individuals of the "share-my-email" organization. The communication networking system, or an administrator thereof, may review and provide verification of the email communication before it is allowed to be sent to the search selected subset of the "share-my-email" organization. Each individual of this search selected subset of the "share-my-email" organization may receive a portion of the payment received by the medical company.

If the contact organization does not verify the solicitor email communication within a certain time, such as before the end of the buffer time for that communication period, the solicitor email may not be sent out and any payment received by the solicitor may be refunded. The verification process may be through the contact organization website interface on the website.

Medical conditions, as used herein, refers to illnesses, diseases and disorders that may be temporary or chronic and may be conditions that are genetic or autoimmune conditions, and include but are not limited to, multiple sclerosis, systemic lupus erythematosus, rheumatoid arthritis, diabetes, cancer, down syndrome, asthma, heart disease, Crohn's disease, celiac disease, blindness, deafness, and the like.

In an exemplary embodiment, a solicitor website interface enables a solicitor to input a medical condition and search for a list of services. The system may prompt and request or require the solicitor to input other geographical, demographic and medical condition information as well as request the individuals email address for including on the share-my-email contact organization list, before they are allowed to search for the list of services. The list of services may be for those that are deaf for example and the services may be federal and/or state government services or a charitable service. The service providers listed may also be contact organizations of the communication networking system.

The payment received by a solicitor may be paid in part to the contact organization(s) that the solicitor's email communication was sent to. There may be processing costs by the communication networking system but a substantial portion, such as at least 50% or more may go to the contact organization. When the contact organization is a share-my-email contact organization, the fee collected from the solicitor may be split by all of the individuals of that organization or those included in a searched subset of the share-my-email contact organization, as described herein.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
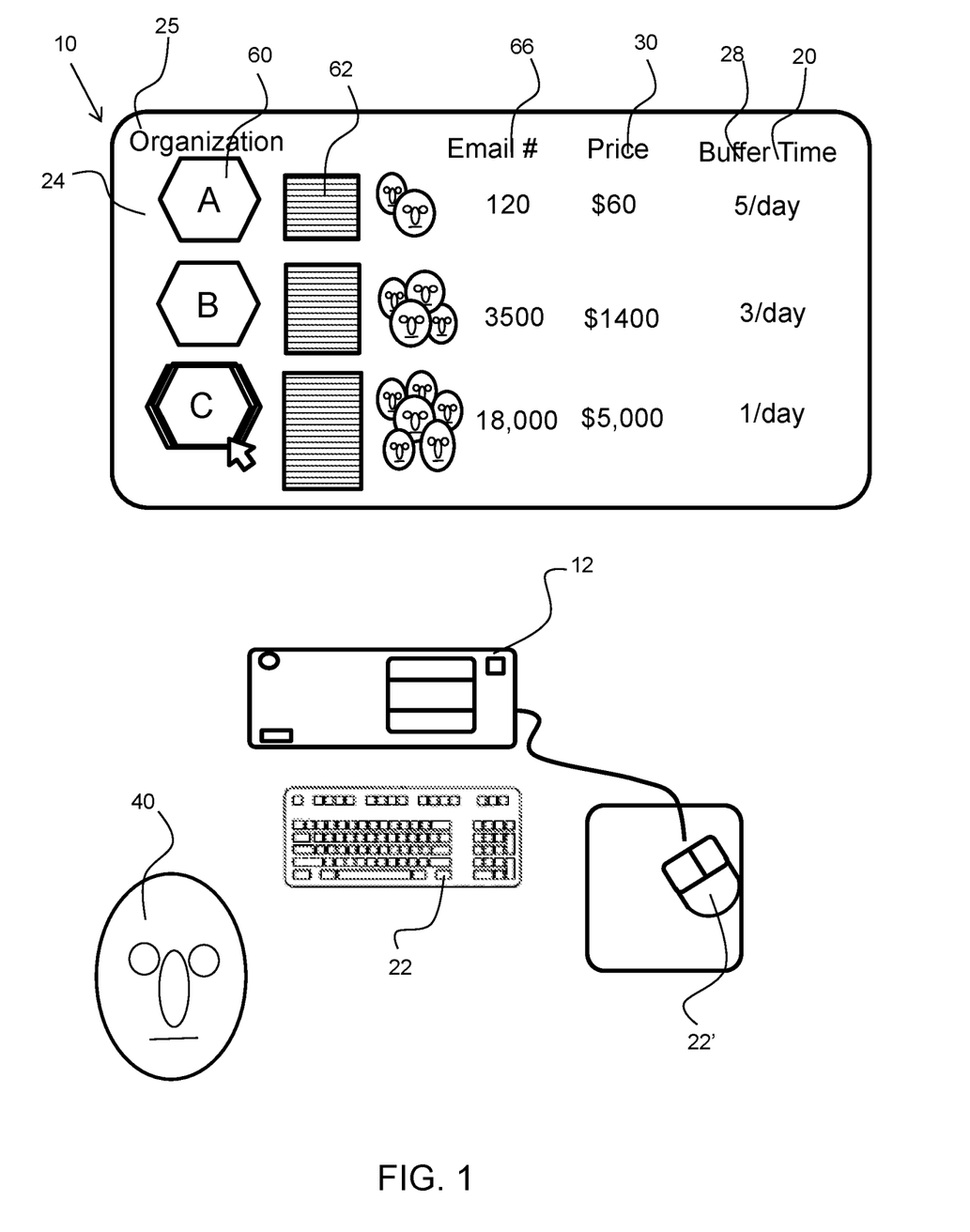
FIG. 1 shows an exemplary solicitor website interface display of the communication networking system.

As shown in FIG. 1, a communication network system 10 utilizes a website 20 that provides a solicitor website interface 24 that produces a display 25 of a list of contact organizations 60 and their respective number of organization recipient email address 66 in the respective contact organization's email list 62. Also, the fee 30 for sending out a solicitor communication is displayed. The solicitor 40 is selecting contact organization "C" with the input devices, the keyboard 22 and the mouse 22', the mouse through the computer 12. Contact organization "C" may be a Children's Cancer Hospital and the solicitor may be a nearby hotel. The Children's Cancer Hospital has 18,000 organization recipient email address on their email list 62 and the fee to send out an email communication to their email list is $5000. The buffer time 28 reveals how many solicitor email communications can be sent out in a period of time, such as five per day or one per day. The buffer time may also be shown as a date and time that a solicitor email communication will be sent out, or a deadline date and time to provide a solicitor email communication for verification by the contact organization.

Figure 2:
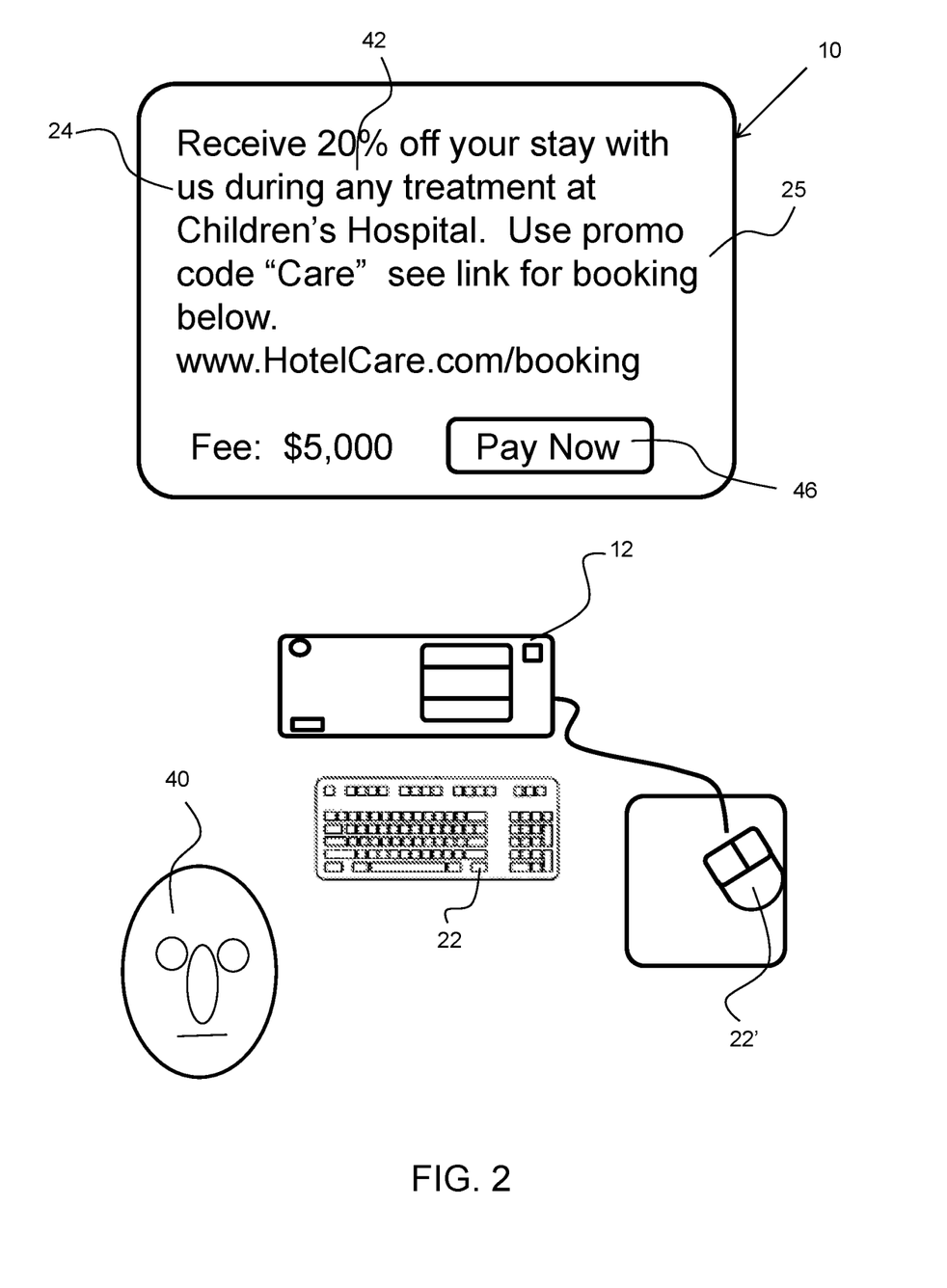
FIG. 2 shows the solicitor inputting a solicitor email communication through the solicitor website interface and making a payment for sending the email communication to a selected contact organization.

As shown in FIG. 2, the solicitor 40 has input a solicitor email communication 42 through the solicitor website interface 24. The solicitor is also making a payment 44, through the solicitor payment feature 46 to the communication networking system 10.

Figure 3:
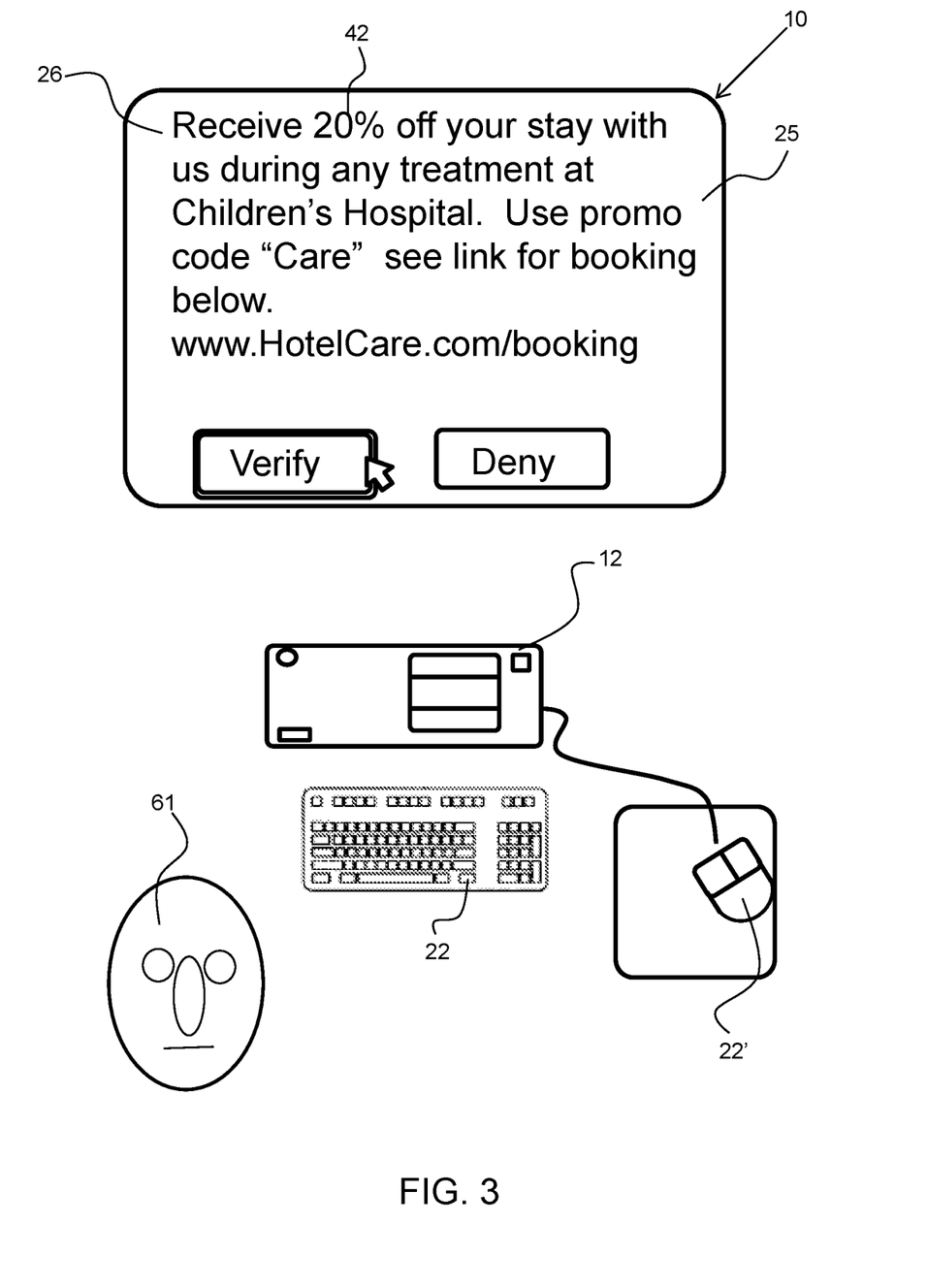
FIG. 3 shows an associate of the selected contact organization using the organization website interface to verify and accept the solicitor email communication.

As shown in FIG. 3, an associate of the selected contact organization 61, the Children's Cancer Hospital, is using the organization website interface 26 to verify and accept the solicitor email communication 42. The solicitor email communication will therefore be sent to the recipients on the contact organization's email list.

Figure 4:
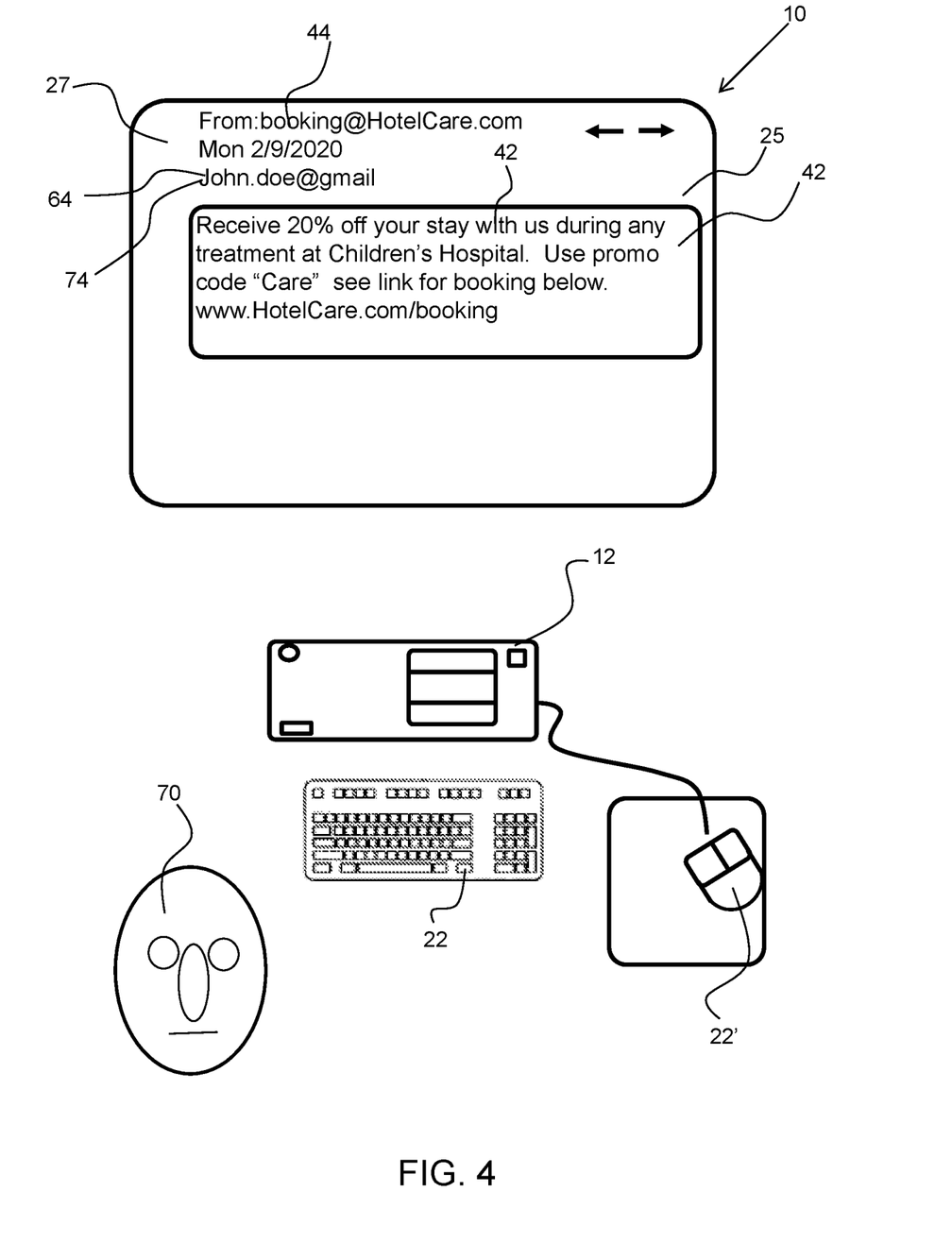
FIG. 4 shows one of the recipients of the contact organization's email list receiving the solicitor email communication in their email.

As shown in FIG. 4, one of the recipients 70 on the contact organization's email list has received the solicitor email communication 42 in their recipient email 27. The recipients email address 74 which is one of the contact organizational email addresses 64 is shown on the display 25. The solicitor email address 44 is shown in the from line of the email communication.

Figure 5:
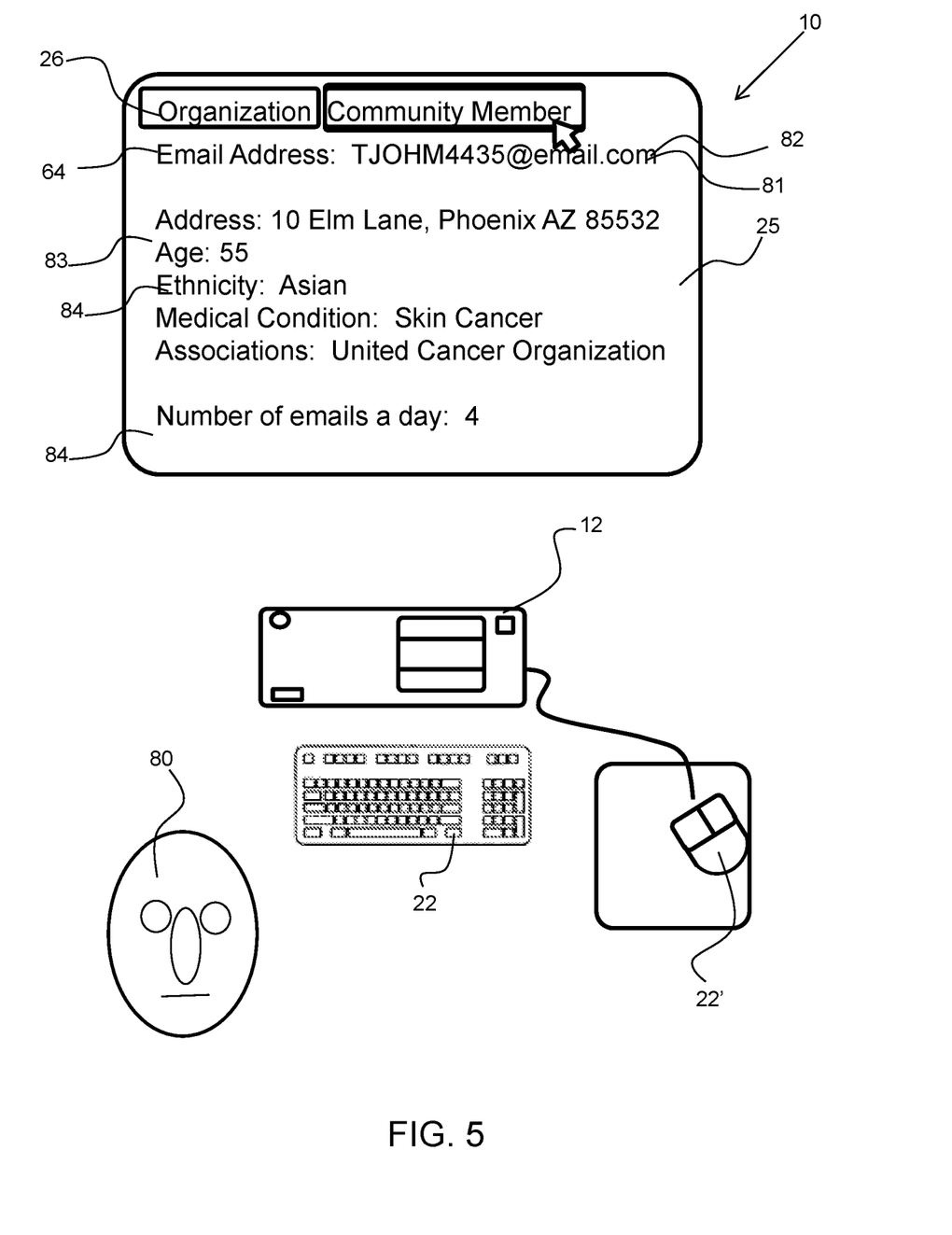
FIG. 5 shows a contact organization website interface and a community member inputting geographical and demographical information along with their email address to become a share-my-email community member.

As shown in FIG. 5 a contact organization website interface 26 is being used by an individual to provide a geographical input 83 and demographical input 84 along with their email address 82 to become a share-my-email community member 80. The person has selected from the organization or community member selections at the top of the display 25. A contact organization may select the organization tab to input information about the organization including uploading the contact organizations email list. The person's email address 81 will become a share-my-email email address 82 that will be made available to for receiving solicitor communications. The share-my-email community member is also using the email frequency input 84 to input the frequency of emails they are willing to receive, four a day.

Figure 6:
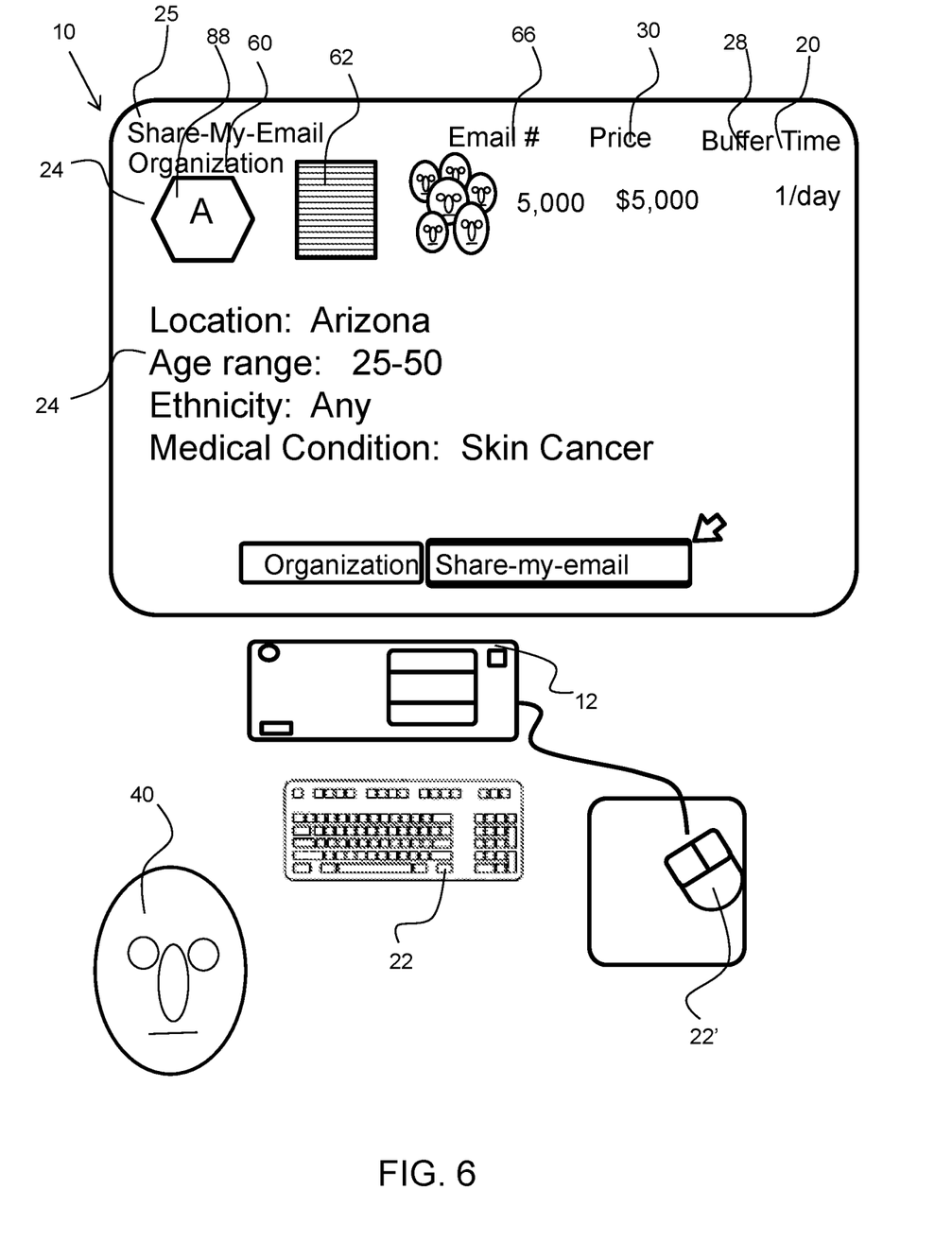
FIG. 6 shows a solicitor website interface having a search feature for the solicitor to search for share-my-email contact organizations that meet their search criteria.

As shown in FIG. 6, a solicitor website interface 24 is being used by a solicitor 40 to search for a particular share-my-email organization 88 having a contact organization email list 62 determined by the search criteria input. The solicitor is using a contact organization search feature 29 to input search criteria for the contact organization. Note that the solicitor has selected the share-my-email tab to enable searching by geographic, demographic and medical conditions criteria. If the solicitor selects the organization tab, the search input displayed may be different, however medical condition and geographic search criteria may still be used.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of email communication comprising:
   a) providing a communication networking system comprising:
      i) a website coupled with a database;
      ii) a solicitor website interface;
      iii) a contact organization website interface;

said website displaying a plurality of contact organizations each having an email list;
wherein each of the email lists includes a plurality of email list recipients defined by an organization recipient email address;
b) wherein said solicitor website interface on the website allows a solicitor to view said plurality of contact organizations;
c) said solicitor selecting a selected contact organization from the plurality of contact organizations;
d) said communication networking system receiving a solicitor email communication from said solicitor;
e) receiving a payment from said solicitor;
said communication networking system sending said solicitor email communication to the plurality of email list recipients of the organization recipient email address of the selected contact organization;
wherein the selected contact organization receives a portion of the payment;
wherein the organization recipient email address is not divulged to the solicitor;
wherein the plurality of contact organizations includes a plurality of business organizations;
wherein the solicitor website interface displays the number of organization recipient email addresses for a contact organization;
wherein the solicitor website interface enables a solicitor to select two or more selected contact organizations and wherein the solicitor website interface enables the solicitor to select a "both" delivery, wherein the solicitor email communication is sent only to the organization recipient email addresses that are on all of the two or more selected contact organizations; and wherein the two or more selected contact organizations are business organizations;
wherein the contact organization website interface enables each of the plurality of contact organizations to set a frequency of solicitor email communications through the contact organization website interface on the website;
wherein the communication networking system further includes demographic information of at least a portion of the plurality of email list recipients and wherein the user interface provides a demographic input for a solicitor;
wherein the solicitor website interface further provides a geographical input for a solicitor to input a solicitor location; and
wherein the communication networking system further includes a contact organization search feature for a solicitor to input search criteria for the plurality of contact organizations.

2. The method of email communication of claim 1, wherein the solicitor website interface displays a buffer time for at least some of the contact organizations.

3. The method of email communication of claim 1, wherein payment received by said solicitor is an auction payment, wherein two or more solicitors place auction bids through the solicitor website interface until an auction deadline and wherein the highest auction bid allows a highest auction bidding solicitor of the two or more solicitors to then send a solicitor email communication to the organization recipient email addresses of the selected contact organization.

4. The method of email communication of claim 1, further comprising verification of the solicitor email communication by the selected contact organization, wherein the solicitor email communication is provided to the selected contact organization for review and verification prior to sending the solicitor email communication to the organization recipient email addresses of the selected contact organization.

5. The method of email communication of claim 4, wherein when the selected contact organization does not provide verification within a buffer time for the solicitor email communication, the payment is not received by the solicitor and the solicitor email communication is not sent to the organization recipient email addresses of the selected contact organization.

6. The method of email communication of claim 4, wherein verification is conducted through the contact organization website interface on the website.

7. The method of email communication of claim 1, wherein the plurality of contact organizations comprises a "share-my-email" organization that includes email list recipients that have provided demographic information to the communication networking system.

8. The method of email communication of claim 7, wherein the user interface provides a demographic input for a solicitor to search said email list recipients of the "share-my-email" organization for said demographic information.

9. The method of email communication of claim 8, wherein the demographic input provides input comprising age, race, and gender.

10. The method of email communication of claim 1, wherein the demographic information includes age, race, and gender.

11. The method of email communication of claim 1, wherein the demographic input includes at least one medical condition.

12. The method of email communication of claim 11, wherein the communication networking system comprises a services search feature that provides a list of services for said at least one medical condition.

13. The method of email communication of claim 11, wherein the list of services includes at least one federal provided service.

14. The method of email communication of claim 11, wherein the list of services includes at least one state provided service.

15. The method of email communication of claim 11, wherein the list of services includes at least one charitable provided service.

16. The method of email communication of claim 8, wherein the solicitor website interface includes a search subroutine for the share-my-email contact organization.

\* \* \* \* \*